(12) United States Patent
Lee

(10) Patent No.: US 7,359,141 B2
(45) Date of Patent: Apr. 15, 2008

(54) SERVO CONTROL METHOD, APPARATUS USING THE SAME, AND RECORDING MEDIUM HAVING PROGRAM FOR EXECUTING THE METHOD

(75) Inventor: Jung-ho Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/444,298

(22) Filed: Jun. 1, 2006

(65) Prior Publication Data

US 2007/0025011 A1 Feb. 1, 2007

(30) Foreign Application Priority Data

Jul. 28, 2005 (KR) ............... 10-2005-0069146

(51) Int. Cl.
*G11B 5/596* (2006.01)
(52) U.S. Cl. .................................. 360/78.06
(58) Field of Classification Search ........... 360/78.06, 360/78.08, 75, 78.04, 78.07, 78.14, 69
See application file for complete search history.

(56) References Cited

U.S. PATENT DOCUMENTS

| | | | | |
|---|---|---|---|---|
| 3,838,457 A | * | 9/1974 | Palmer ................ | 360/78.04 |
| 5,995,318 A | * | 11/1999 | Hasegawa et al. ....... | 360/78.14 |
| 6,195,222 B1 | * | 2/2001 | Heminger et al. ....... | 360/78.07 |
| 6,744,590 B2 | * | 6/2004 | Chu et al. ............ | 360/78.06 |
| 6,801,384 B2 | * | 10/2004 | Chu et al. ............ | 360/78.07 |
| 2006/0082922 A1 | * | 4/2006 | Shih ................. | 360/78.06 |
| 2006/0119978 A1 | * | 6/2006 | Kim et al. ........... | 360/78.06 |
| 2006/0139792 A1 | * | 6/2006 | Lee .................. | 360/78.06 |
| 2006/0158772 A1 | * | 7/2006 | Lee et al. ........... | 360/78.04 |
| 2006/0171063 A1 | * | 8/2006 | Chu et al. ........... | 360/78.07 |
| 2006/0268446 A1 | * | 11/2006 | Cho ................. | 360/75 |
| 2006/0268449 A1 | * | 11/2006 | Chu et al. ........... | 360/78.06 |
| 2006/0279870 A1 | * | 12/2006 | Lee .................. | 360/69 |

FOREIGN PATENT DOCUMENTS

| | | |
|---|---|---|
| JP | 06-318315 | 11/1994 |
| JP | 2002-150727 | 5/2002 |
| JP | 2004-30777 | 1/2004 |

* cited by examiner

*Primary Examiner*—Fred F. Tzeng
(74) *Attorney, Agent, or Firm*—Staas & Halsey LLP

(57) ABSTRACT

The sequential seek method includes calculating a seek length by comparing a cylinder number of a current track with a cylinder number of a target track; checking if the seek length corresponding to a cylinder number is equal to or smaller than 2; calculating a seek length by comparing a position of a head in a current data track with a position of the head in a center line of a target data track if the seek length corresponding to the cylinder number is equal to or smaller than 2; calculating a seek time corresponding to the seek length corresponding to the head position; calculating seek trajectories based on the seek time denoted by a head position and the seek length thereof; and controlling a current being applied to a voice coil motor to move the head along the calculated trajectories calculated.

8 Claims, 5 Drawing Sheets

SERVO CONTROL METHOD, APPARATUS USING THE SAME, AND RECORDING MEDIUM HAVING PROGRAM FOR EXECUTING THE METHOD

CROSS-REFERENCE TO RELATED APPLICATIONS

This application claims the benefit of Korean Patent Application No. 10-2005-0069146, filed on Jul. 28, 2005 in the Korean Intellectual Property Office, the disclosure of which is incorporated herein in its entirety by reference.

BACKGROUND OF THE INVENTION

1. Field of the Invention

The present invention relates to a servo control method for a hard disc drive, and more particularly, to a sequential seek method to move a head of a hard disc drive from a track to an adjacent track, a hard disc drive using the same, and a computer readable recording medium storing a program to execute the same.

2. Description of the Related Art

A hard disc drive (HDD) is a device for storing information on discs. Generally, in a HDD, information is written on concentric tracks on a surface of a disc. The disc is mounted on a spindle motor. The surface of the disc is accessed by a read/write head, which is mounted on an actuator arm being rotated by a voice coil motor (VCM). To rotate the actuator, the VCM is controlled by a servo circuit. The read/write head detects a magnetic field on a surface of the disc to read information recorded thereon. Meanwhile, the read/write head generates a magnetic field to write information to the surface of the disc. The magnetic field generated by the read/write head magnetizes the surface of disc in accordance with the desired information to write. In read/write operations, the servo circuit controls a movement of the read/write head by providing the VCM with a VCM driving current.

According to a tendency of high storage capacity, a track pitch of a HDD has become narrower. As the track pitch becomes narrower, the interference between tracks becomes more prominent. Although this interference, called an adjacent track erase (ATE), is mainly influenced by a track pitch, there are other factors that affect it such as a head width, a frequency characteristic of a head, a head gap, a location on the disc, etc. Since the location on the disc is more important than the other factors, it is necessary to vary the track pitch accordingly.

To vary a track pitch according to the location on the disc, a flexible data track (FDT) is used. A disc has a plurality of tracks and every track includes servo sectors and data sectors. In general, one or more data sectors are placed between servo sectors in an embedded servo. By the FDT, a track pitch of a servo sector and that of a data sector are essentially different from each other and the difference there between varies according to the location on the disc.

FIG. 1 illustrates an arrangement of servo sectors and data sectors according to the FDT. According to the FDT, a track pitch of a servo sector and that of a data sector becomes different from each other as shown in FIG. 1. Generally, a surface of a disc of a HDD is segmented into a plurality of areas, so called zones, and a data track pitch varies according to the respective zones. In addition, the further out the zone on the disc is, the larger the data track pitch is. The data track pitch for a respective zone is contained in a zone map table as one of the parameters for specifying the structure of zones.

Such a variance of the data track pitch may sometimes obstruct track seek operations and, in particular, a track seek operation in the outer area of the disc.

FIG. 2 illustrates a flow chart of a conventional track seek method. Referring to FIG. 2, it can be seen that the conventional track seek method is based on the seek length, which is calculated as a difference between a current cylinder number and a target cylinder number. In a HDD, tracks in a vertical direction, called a cylinder, all have the same track number, and thus, sometimes a track or a track address is referred to as a cylinder or a cylinder number.

Referring to FIG. 2, in operation S202, a seek length sk_len is calculated as a difference between a current cylinder number current_cyl and a target cylinder number target_cyl.

In operation S204, a seek time sk_time, which is a time for moving a head as much as the seek length sk_len, is calculated.

In operation S206, seek trajectories to specify behaviors of the head and a VCM driving current during a track seek operation are calculated by using the seek length sk_len and the seek time sk_time. Seek trajectories includes a position trajectory, a velocity trajectory, and a current trajectory.

In operation S208, a VCM is driven to move the head based on the seek trajectories. The head reads servo sectors while it is being moved by the VCM. By using servo information contained in servo sectors, states of the head, for example, a position of the head, a velocity of the head, an acceleration of the head, etc., are estimated and compared with those of a certain trajectory. The results of the comparison are forwardly fed to control the VCM driving current.

In operation S210, it is checked whether the head arrived at the target cylinder target_cyl. If it is determined that the head did not arrive at the target cylinder target_cyl, then the method returns to operation S208. Otherwise, the track seek operation is terminated.

As can be seen in FIG. 2, in a conventional servo control method, the seek length sk_len is calculated based on the cylinder numbers of a current cylinder current_cyl and a target cylinder target_cyl. However, by this characteristic of the conventional servo control method, sometimes, a track seek operation is obstructed in a HDD adopting a FDT.

FIG. 3 illustrates different cases for a track seek operation over adjacent data tracks (hereinafter a sequential seek). Referring to FIG. 3, a difference between sector tracks in one case, denoted by ① (case 1), is 1, whereas in the other case, denoted by ② (case 2), is 2, despite the fact that the differences between data tracks are all equal to 1. This means that the seek time sk_time is longer in case 2 than in case 1 for a sequential seek, which negatively affects the performance of a HDD.

A specification of a HDD specifies the time of the sequential seek. As is well known, tracks of a HDD are formed in concentric circles. This means that the head ought to move to a next track to read/write subsequent data when the subsequent data is allocated to the next track.

To increase the rate of data transmission, a movement of the head ought to be synchronized with the transmission of data, and thus, a time to move the head from a track to next track is strictly specified.

Referring to FIG. 3 again, synchronization can be achieved in case 1, whereas it cannot be achieved in case 2. If a data transmission operation is not synchronized with a head movement, the performance of a HDD is lowered. Thus a track seek operation cannot be done in a requested sequential seek time, and thereby a data transmission operation has to be delayed until a target data sector is relocated under the head after one more rotation of a disc.

Further, referring to FIG. 3, the possibility not to achieve synchronization in a sequential seek is increased relative to the increase of the difference between the track pitch of a servo track and that of a data track. Accordingly, the possibility of lowering the performance of the HDD is increased when a sequential seek takes place in an outer area of the disc.

SUMMARY OF THE INVENTION

Additional aspects and/or advantages of the invention will be set forth in part in the description which follows and, in part, will be apparent from the description, or may be learned by practice of the invention.

The present invention provides a sequential seek method to prevent loss of synchronization between a head movement and a data transmission, and thereby improve the performance of a HDD.

The present invention provides a HDD having improved performance by using a sequential seek method to prevent loss of synchronization between a head movement and a data transmission.

The present invention also provides a computer readable recording medium storing a program for executing the method.

According to an aspect of the present invention, there is provided a track seek method for an HDD, the method including: calculating a seek length by comparing a cylinder number of a current track with a cylinder number of a target track; checking if the seek length corresponding to a cylinder number is equal to or smaller than 2; calculating a seek length by comparing a position of a head in a current data track with a position of the head in a center line of a target data track if the seek length corresponding to the cylinder number is equal to or smaller than 2; calculating a seek time corresponding to the seek length corresponding to the head position; calculating seek trajectories based on the seek time denoted by a head position and the seek length thereof; and controlling a current being applied to a voice coil motor to move the head along the calculated trajectories calculated.

According to another aspect of the present invention, there is provided an HDD including: a head for writing information on disc and reading information from the disc; a voice coil motor for moving the head; and a controller for moving the head in a sequential seek mode by calculating a seek length by comparing a cylinder number of a current track with a cylinder number of a target track, calculating a seek length by comparing a position of the head in a current data track with a position of the head in a center line of the target data track if the seek length corresponding to the cylinder number is equal to or smaller than 2, calculating a seek time corresponding to the seek length corresponding to a head position, calculating seek trajectories based on the seek time corresponding to the head position and the seek length thereof and controlling a current being applied to the voice coil motor to move the head along the calculated trajectories.

According to still another aspect of the present invention, there is provided a computer readable recording medium storing a program to execute a track seek method, the method including: calculating a seek length by comparing a cylinder number of a current track with a cylinder number of a target track; checking if the seek length corresponding to a cylinder number is equal to or smaller than 2; calculating a seek length by comparing a position of a head in a current data track with a position of the head in a center line of a target data track if the seek length corresponding to the cylinder number is equal to or smaller than 2; calculating a seek time corresponding to the seek length corresponding to the head position; calculating seek trajectories based on the seek time denoted by a head position and the seek length thereof; and controlling a current being applied to a voice coil motor to move the head along the calculated trajectories calculated.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

The present invention will now be described more fully with reference to the accompanying drawings in which exemplary embodiments of the invention are shown. In the description of the structure and operation of the present invention, an example of applying the present invention to a hard disc drive (HDD) will be explained. However, it should be noted that the present invention is not limited to the HDD.

Figure 1:
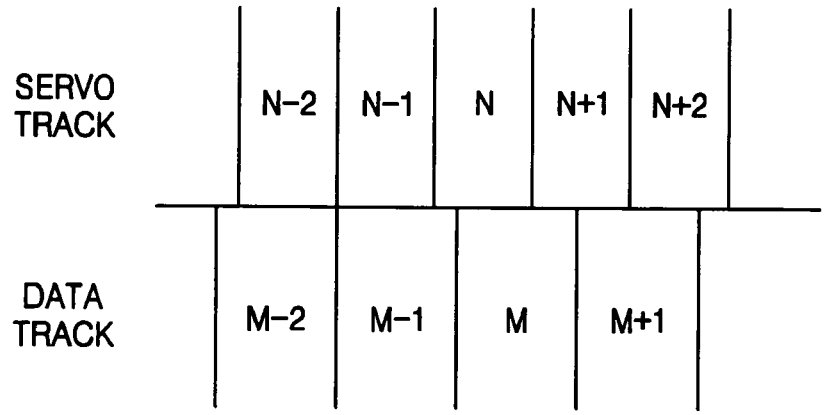
FIG. 1 illustrates an arrangement of servo tracks and data tracks according to a FDT.
Figure 2:
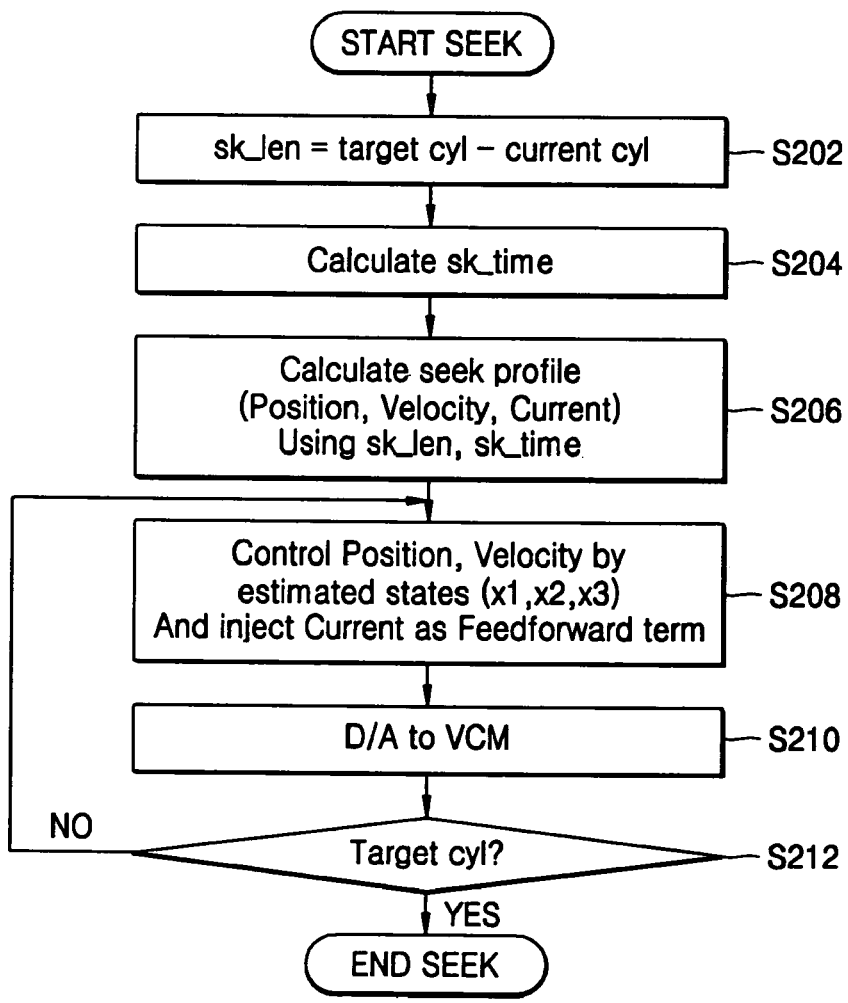
FIG. 2 illustrates a conventional track seek method.
Figure 3:
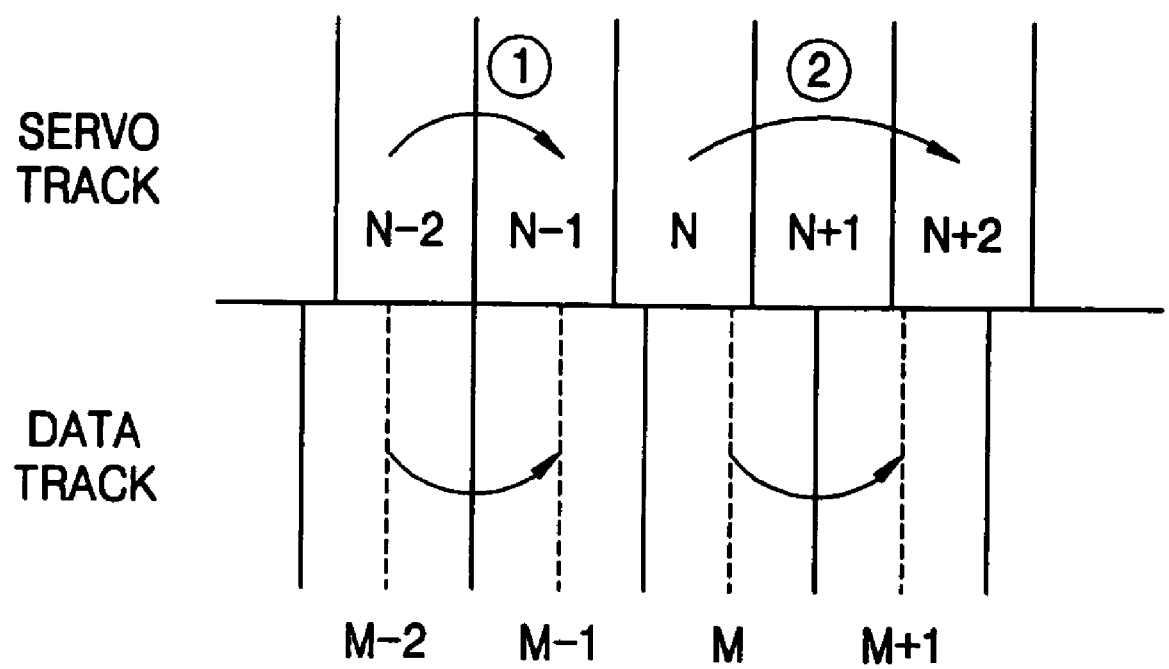
FIG. 3 illustrates different cases of a track seek operation performed between adjacent data tracks.
Figure 4:
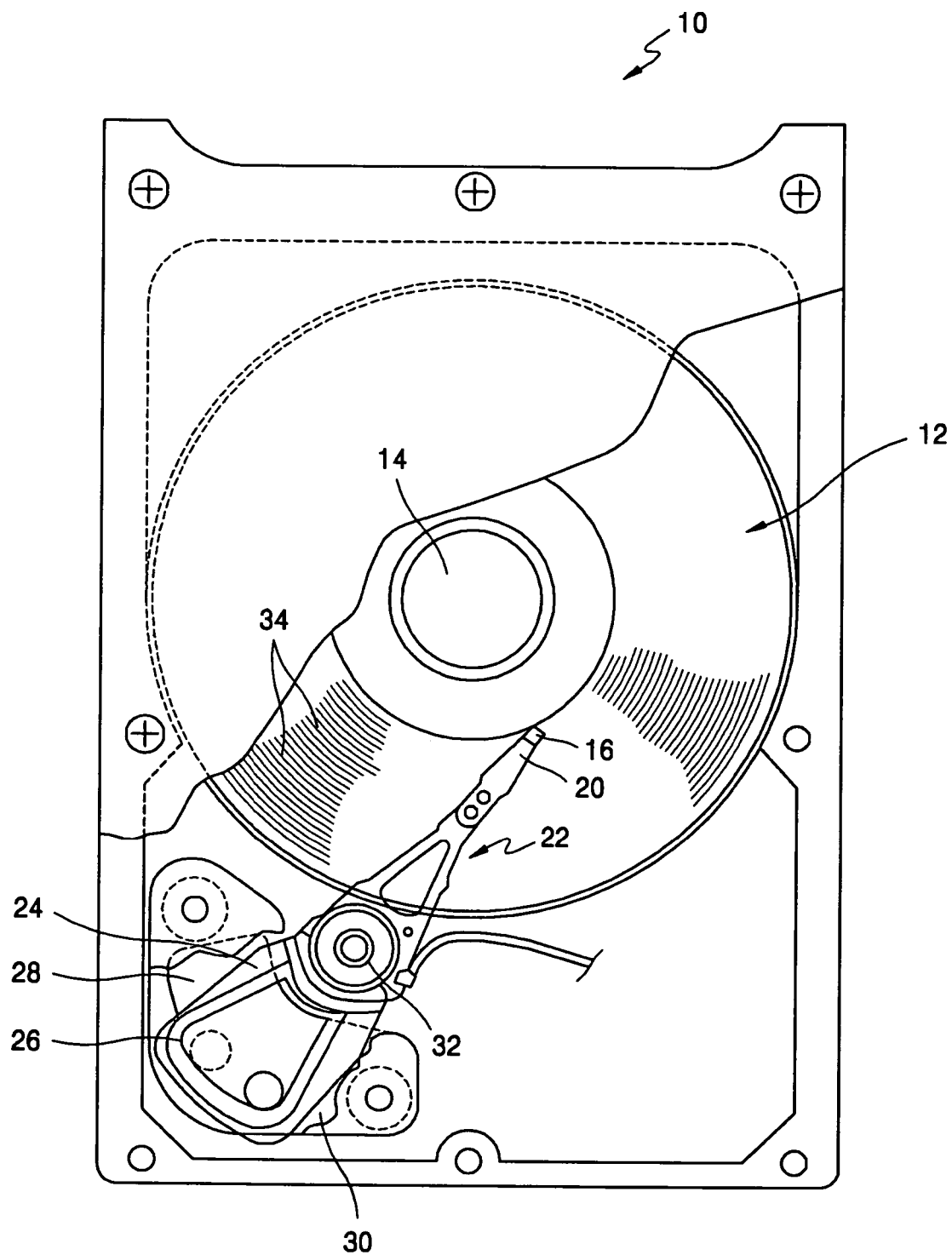
FIG. 4 illustrates the structure of a hard disc drive (HDD) using a method of the present invention.

FIG. 4 illustrates the structure of a hard disc drive (HDD) 10 using the method of the present invention.

The HDD 10 shown in FIG. 4 incldes at least one disc 12 that is spun by a spindle motor 14. The HDD 10 further includes a head 16 positioned near a surface of the disc 12. The head 16 senses a magnetic field of the disc 12 or magnetizes the disc 12 to read or write data from or onto the spinning disc 12. Typically, the head 16 is combined with the surface of each disc 12. Though one head 16 is described herein, it should be understood that the head 16 includes a writing head that magnetizes the disc 12 and a reading head that senses the magnetic field of the disc 12.

The head 16 may be integrated into a slider 20. The slider 20 has a structure in which an air bearing is created between the head 16 and the surface of the disc 12. The slider 20 is combined with a head gimbal assembly 22.

The head gimbal assembly 22 is attached to an actuator arm 24 having a voice coil 26. The voice coil 26 is positioned close to a magnetic assembly 28 that defines a voice coil motor (VCM) 30. A current applied to the voice coil 26 generates a torque that causes the actuator arm 24 to rotate around a bearing assembly 32. The rotation of the actuator arm 24 may allow the head to move across the surface of the disc 12.

Typically, information is stored in concentric tracks of the disc 12. Each track 34 generally has a plurality of servo sectors. Each servo sector includes a data field and an identification field. The identification field is formed with a gray code to distinguish a sector and a track (cylinder). The head 16 moves across the surface of the disc 12 to read information from or to write information in another track.

Figure 5:
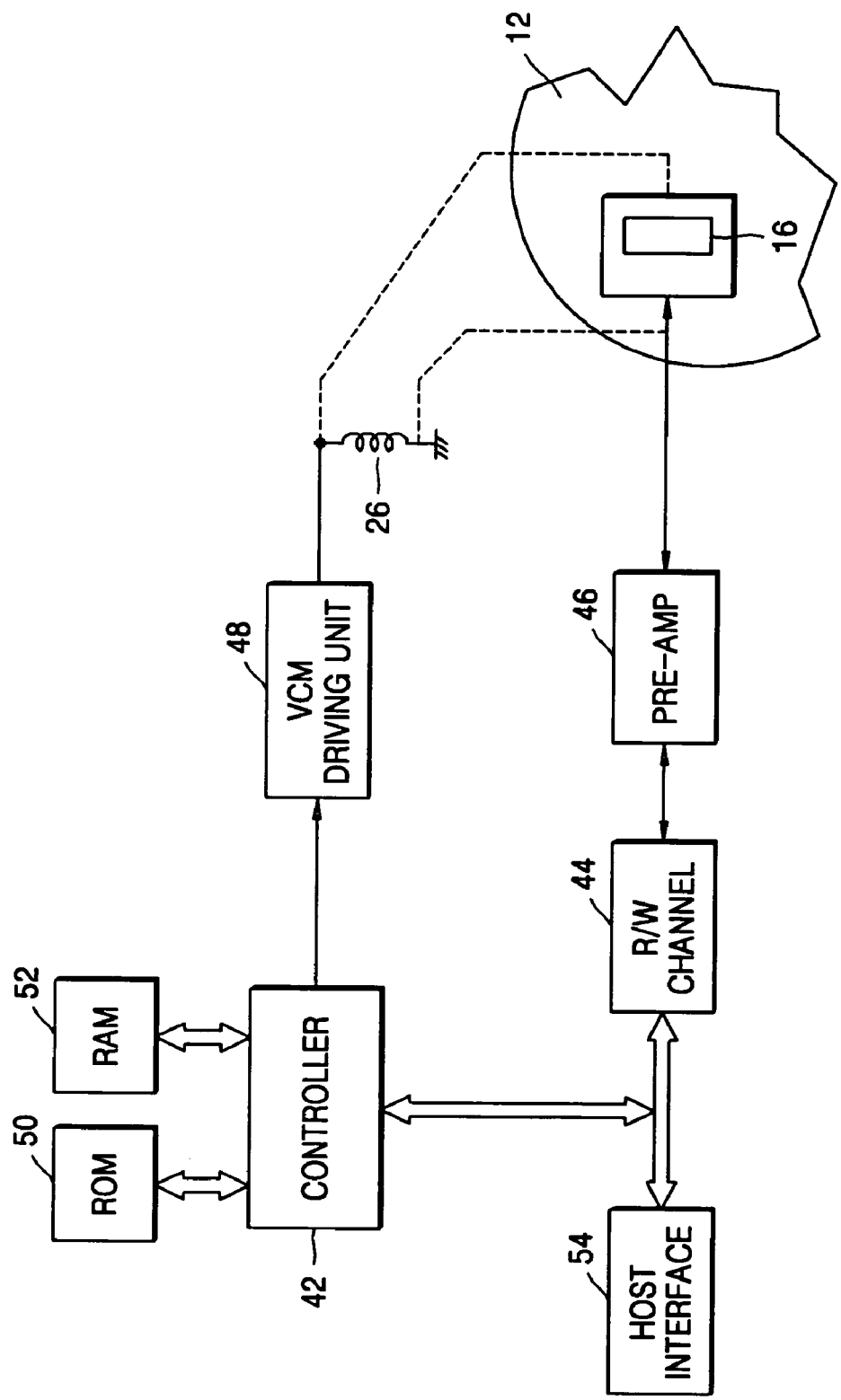
FIG. 5 illustrates an electric system for controlling the HDD shown in FIG. 5.

FIG. 5 illustrates an electric system for controlling the HDD shown in FIG. 4. The electric system shown in FIG. 4 includes a controller 42 connected to the head 16 via a read/write (RNV) channel circuit 44 and a pre-amp circuit 46. The controller 42 may be a digital signal processor (DSP), a microprocessor, a micro controller, or the like. The controller 42 provides a control signal to the R/W channel 44 to read or write data from or onto the disc 12. Generally, information is transmitted from the R/W channel 44 to a host interface circuit 54. The host interface circuit 54 includes a buffer memory and a control circuit to interface with a system such as a personal computer.

The controller 42 is also connected to a VCM driving circuit 48 supplying a driving current to the voice coil 26. The controller 42 provides a control signal to the VCM driving circuit 48 in order to control the excitation of the VCM 30 and the movement of the head 16.

The controller 42 is connected to a non-volatile memory 50 such as read only memory (ROM) and a flash memory device, and a random access memory (RAM) device 52. The memory devices 50 and 52 include commands and data used by the controller 42 to execute a software routine.

As one of software routines, there is a track seek control routine for moving the head 16 from one track to another track.

Figure 6:
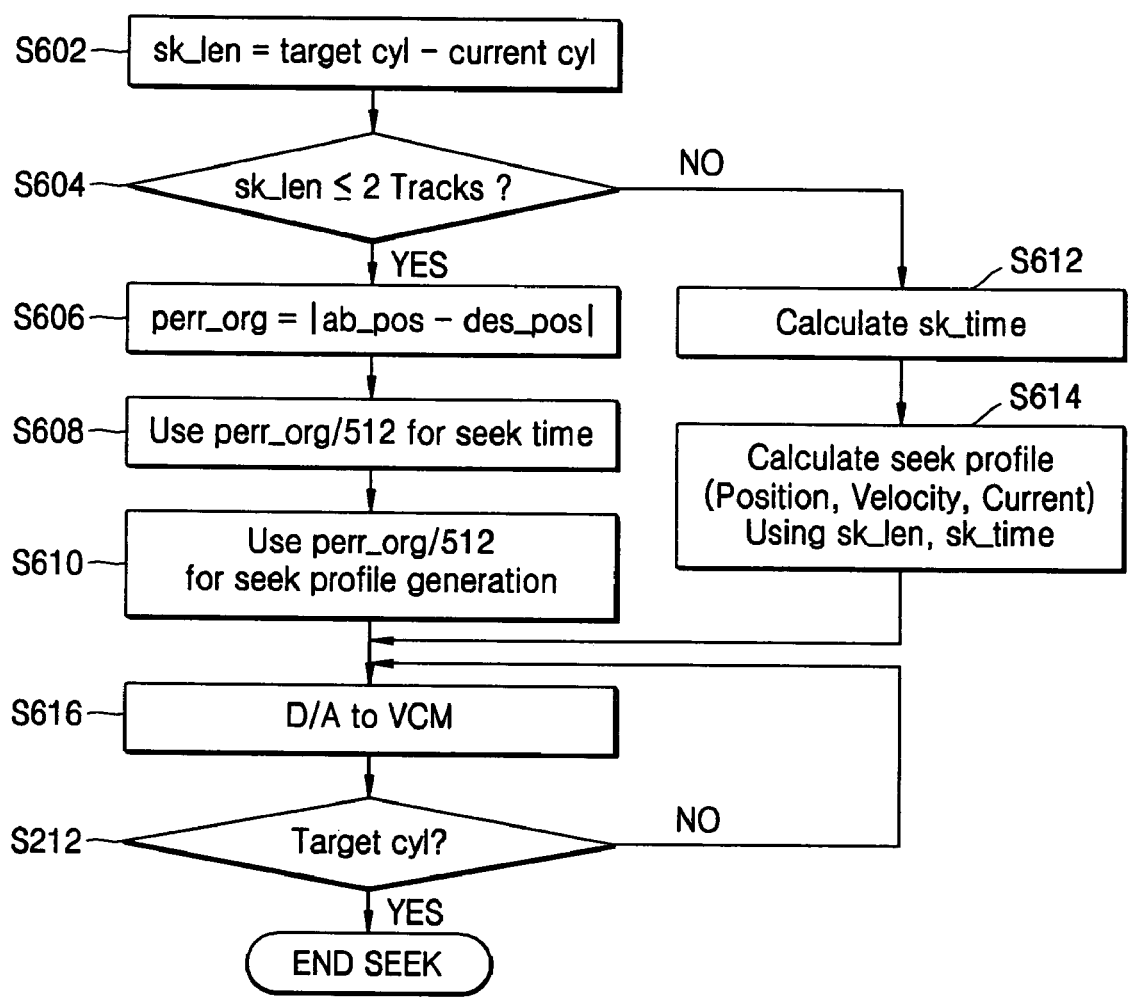
FIG. 6 illustrates a track seek method according to an embodiment of the present invention.

Also, a program to execute the track seek method according to the present invention to be described hereinafter with reference to FIG. 6 is stored in the memory device 50.

FIG. 6 illustrates a flow chart of a sequential seek method according to an embodiment of the present invention. Referring to FIG. 6, the sequential seek method according to an embodiment of the present invention performs a sequential seek based on the difference of head positions when a difference in cylinder number between a current cylinder and a target cylinder is equal to or smaller than 2.

Referring to FIG. 6, in operation S602, a seek length sk_len is calculated by using a difference between a current cylinder number current_cyl and a target cylinder number target_cyl.

In operation S604, it is checked whether a seek length sk_len corresponding to a cylinder number is equal to or smaller than 2.

If it is determined that a seek length sk_len corresponding to a cylinder number is equal to or smaller than 2 then in operation S606 a seek length perr_org is calculated by comparing a position of a head in the current data track with that of the head in a centerline of the target data track.

The position of the head in the current data track can be detected by referring to a gray code and a position error signal (PES). The gray code is contained in a servo sector and the PES is generated by using servo bursts in the servo sector. Here, it is better if the resolution in detecting the position of the head is higher. In the embodiment of the present invention, the resolution is 512. That is, the position in a data track is detected with a step size of 1/512.

Meanwhile, the position of the centerline of the target data track can be calculated by referring to a target data track and a zone map table. As well as the position of a head in the current data track, the position of the centerline of the target data track can be detected with the resolution of 512.

In operation S608, a seek time corresponding to the seek length perr_org corresponding to a head position is calculated. Here, the seek length perr_org is divided by 512 when calculating the seek time sk_time in consideration of the resolution.

In operation S610, seek trajectories based on the seek length perr_org corresponding to a head position and the seek length thereof sk_time are calculated.

In operation S616, a VCM is driven to move the head based on the seek trajectories.

In operation S618, it is checked whether the head arrived at the target cylinder target_cyl. If it is determined that the head did not arrive at the target cylinder target_cyl then the method returns to operation S616. Otherwise, the track seek operation is terminated.

Because the seek length perr_org should be smaller than the distance by as much as the number of servo tracks, thus a track seek operation with the seek length perr_org can be done with less time than that with the seek length sk_len. Therefore, a sequential seek can be done within a requested time even thought it is performed over two servo tracks, so that it is possible to prevent the performance of a HDD from being reduced.

If it is determined that a seek length sk_len corresponding to a cylinder number is not equal to or greater than 2, then in operation S612, a seek time sk_time corresponding to the seek length sk_len is calculated.

In operation S614, seek trajectories are calculated by using the seek length sk_len and the seek time sk_time and then a track seek operation is performed through operations S616~S618.

As described above, according to the present invention it is possible to prevent the performance of a HDD from being reduced because a sequential seek can be done within a requested time even it is performed over two servo tracks.

The present invention can be embodied as a method, an apparatus, and a system. When it is embodied as software, elements of the present invention are code segments executing essential functions. Programs or code segments can be stored in a processor readable recording medium, or can be transmitted in a computer data signal coupled with a carrier in a transmission medium or communication network. The processor readable medium is any medium that can store or transmit information. Examples of the processor readable medium include electronic circuits, semiconductor memory devices, read-only memory (ROM), random-access memory (RAM), flash memory, EEPROM, floppy discs, optical data storage devices, hard discs, optical fiber media, and radio frequency (RF) network. Computer data signals include any signal that can be transmitted through electronic network channels, optical fiber, air, electromagnetic field, and RF networks.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A sequential seek method for a hard disc drive, comprising:
    calculating a seek length by comparing a cylinder number of a current track with a cylinder number of a target track;
    checking if the seek length corresponding to a cylinder number is equal to or smaller than 2;
    calculating a seek length by comparing a position of a head in a current data track with a position of the head in a center line of a target data track if the seek length corresponding to the cylinder number is equal to or smaller than 2;

calculating a seek time corresponding to the seek length corresponding to the head position;

calculating seek trajectories based on the seek time denoted by a head position and the seek length thereof; and controlling a current being applied to a voice coil motor to move the head along the calculated trajectories calculated.

2. The method of claim 1, wherein the position of the head is detected by referring to a gray code and a position error signal in the current track.

3. The method of claim 1, wherein the method is applied to a hard disc drive using a flexible data track.

4. The method of claim 1, wherein the position of the center line of the target data track is calculated using a target data track and a zone map table.

5. A hard disc drive, the disc drive comprising:
   a head for writing information on a disc and reading information from the disc;
   a voice coil motor for moving the head; and
   a controller for moving the head in a sequential seek mode by calculating a seek length by comparing a cylinder number of a current track with a cylinder number of a target track, calculating a seek length by comparing a position of the head in a current data track with a position of the head in a center line of the target data track if the seek length corresponding to the cylinder number is equal to or smaller than 2, calculating a seek time corresponding to the seek length corresponding to a head position, calculating seek trajectories based on the seek time corresponding to the head position and the seek length thereof and controlling a current being applied to the voice coil motor to move the head along the calculated trajectories.

6. The hard disc drive of claim 5, wherein the position of the center line of the target data track is calculated using a target data track and a zone map table.

7. A computer readable recording medium storing a program to execute a track seek method of a hard disc drive, the method comprising:
   calculating a seek length by comparing a cylinder number of a current track with a cylinder number of a target track;
   checking if the seek length corresponding to a cylinder number is equal to or smaller than 2;
   calculating a seek length by comparing a position of a head in a current data track with a position of the head in a center line of a target data track if the seek length corresponding to the cylinder number is equal to or smaller than 2;
   calculating a seek time corresponding to the seek length corresponding to the head position;
   calculating seek trajectories based on the seek time denoted by a head position and the seek length thereof; and
   controlling a current being applied to a voice coil motor to move the head along the calculated trajectories calculated.

8. The computer readable recording medium of claim 7, wherein the position of the center line of the target data track is calculated using a target data track and a zone map table.

* * * * *